(No Model.)
H. E. KEYES.
VALVE.
No. 543,692. Patented July 30, 1895.
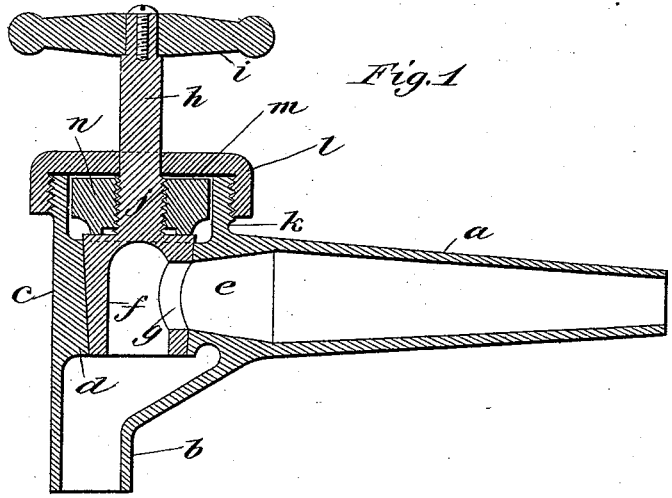
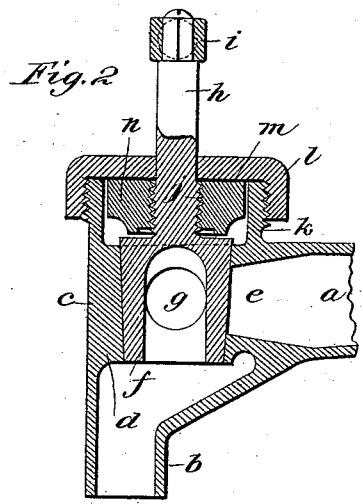
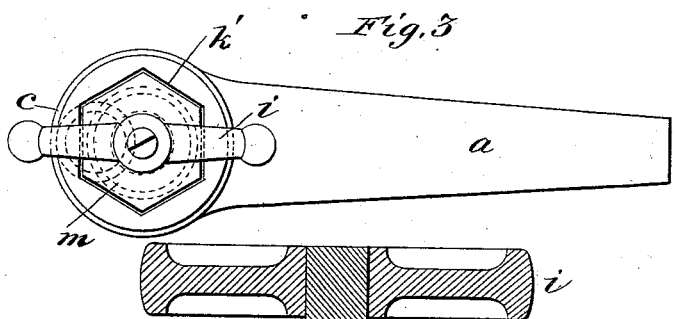
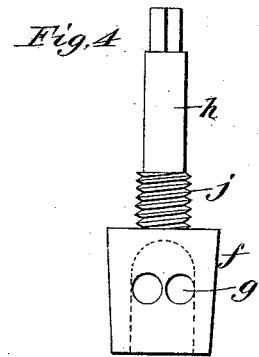
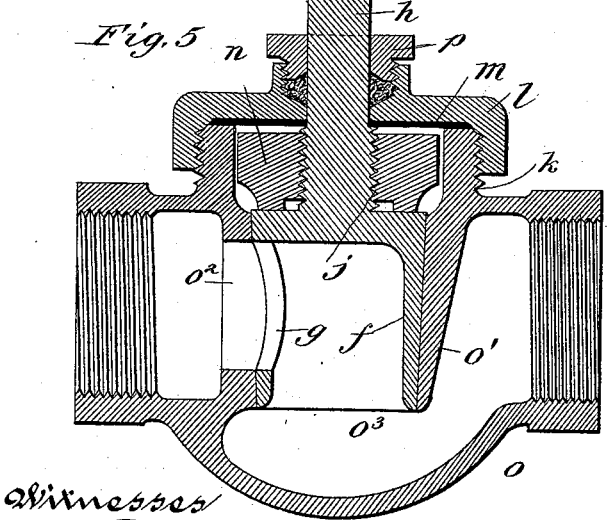
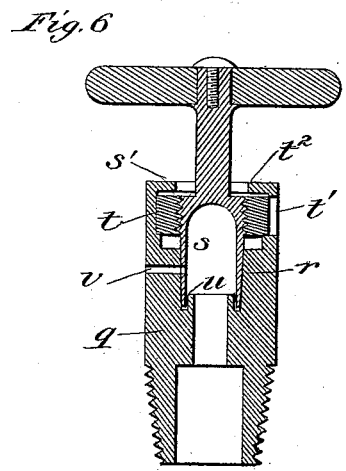
Witnesses
J. T. Coleman
Harry G. Davis
Inventor
Harry E. Keyes,
by W. H. Finckel,
Attys.

UNITED STATES PATENT OFFICE.

HARRY E. KEYES, OF HOMESTEAD, PENNSYLVANIA, ASSIGNOR TO THE HOMESTEAD MANUFACTURING COMPANY, LIMITED, OF SAME PLACE.

VALVE.

SPECIFICATION forming part of Letters Patent No. 543,692, dated July 30, 1895.

Application filed September 29, 1894. Serial No. 524,536. (No model.)

*To all whom it may concern:*

Be it known that I, HARRY E. KEYES, a citizen of the United States, residing at Homestead, in the county of Allegheny and State of Pennsylvania, have invented a certain new and useful Improvement in Valves, of which the following is a full, clear, and exact description.

This invention is entitled "valves," for the reason that it is applicable to a variety of valvular devices—such, for instance, as bib-cocks, globe-valves, gage-cocks, blow-off cocks, faucets, and other such like devices—wherein the plug or valve proper has a reciprocating or rotary reciprocating motion for the purpose of opening or closing the valve.

The object of the invention is to insure the seating of the valve-plug without injury to the plug or its seat and to provide for the easy opening of the valve, thus, incidentally, obviating liability of sticking.

The essential feature of the invention is a traveling check-nut interposed between the plug and some fixed portion of the valve casing or shell, the said nut and plug being connected to move together, whereby in the act of closing the valve, the said traveling nut will come into positive contact with a fixed portion of the valve shell or casing, arrest the undue movement of the plug, and insure its being seated tight, and when the valve is being opened, the said traveling nut will recede from such fixed portion of the shell or casing and thereby ease off the plug from its seat and permit it to be turned readily to full open position, all as I will proceed now more particularly to set forth, and finally claim.

In the accompanying drawings, illustrating my invention, in the several figures of which like parts are similarly designated, Figure 1 is a longitudinal section of a bib-cock constructed in accordance with my invention, showing the valve open. Fig. 2 is a similar section of portion of a bib-cock, showing the valve closed. Fig. 3 is a plan view of the bib-cock shown in Fig. 1, with the bonnet or cap removed. Fig. 4 is an elevation of the rotary plug detached, showing a modification in its port. Fig. 5 is a longitudinal section of a globe-valve constructed in accordance with my invention; and Fig. 6 is a longitudinal section of a gage-cock constructed in accordance with my invention.

Referring to the bib cock the barrel or tube $a$ may be threaded or left plain in either case, as usual, for connecting it for use. The outlet or nozzle $b$ may also be as usual. The body $c$ is provided with a tapering valve-seat $d$ communicating laterally at $e$ with the barrel $a$ and having a vertical communication with the nozzle $b$. Within this seat $d$ is arranged a hollow plug $f$, having the lateral port $g$ for communicating with the port or passage $e$ and thereby opening communication through its interior between the barrel and the nozzle. This plug or valve $f$ is provided with an integral or fixed stem $h$, which may be provided with any suitable cross-head, wheel, handle, or other turning device $i$, and the said stem is provided further with a threaded portion $j$.

The valve-body is provided with a head $k$, within which is made an angular, preferably a hexagonal socket $k'$, as more clearly shown in Fig. 3, and said head is screw-threaded externally to receive a flat-topped or other suitable bonnet or cap $l$, which may be made with an angular periphery, as usual, for facilitating, applying, and removing it. Between the edge of the head and the inner surface of the cap or bonnet a disk or ring or gasket of packing matertial $m$ may be provided. Within the socket $k'$ of the head $k$ is arranged loosely a traveling nut $n$, the said nut being complemental in shape to the socket and having a loose fit therein in order to enable the said nut to travel vertically up and down within the socket without rotation therein, and said nut is provided with a centrally-threaded hole by means of which it is fitted to the threaded portion $j$ of the valve-stem, so that by the rotation of the said valve-stem the said nut is moved up and down in the said socket. The said nut is of sufficiently less height than the distance between the upper portion of the plug and the inner portion of the cap to admit of a limited vertical play of the said nut within its socket.

The operation of this form of my invention is as follows: When the plug is closed by rotation of its stem, the traveling nut $n$ will be moved toward and into contact with the cap or bonnet and not only act as a check-nut against the unnecessary further movement of the plug, but also act as a pressure device to insure the tight seating of the plug in its seat, thereby providing against the possibility of leakage about the seat, and also thereby avoiding the necessity of manually forcing the plug to its seat by further rotation of the plug. Since this traveling nut, coming against a fixed portion of the plug or shell, insures a seating of the plug and avoids the hitherto common methods of forcing the plug to its seat, it is obvious that neither the valve nor its seat is ground away as in the old forms of valves, and hence the life of the valve is greatly prolonged. No matter how hard the plug may have been seated, and no matter how long it may have been closed, still, when it is desired to open the valve a rotation of the valve-stem will serve to rotate the plug and simultaneously act upon the nut and drive it from its contact with the cap or other fixed portion of the casing or shell, thereby easing off the plug from its seat and permitting the turning of the plug without difficulty, and since, as shown in Fig. 1, the bottom of the traveling nut comes into contact with the top of the plug or valve when it is open, the further rotation of the plug beyond full opening is thereby checked. In view, therefore, of the fact that the closing of the valve is checked by the contact of the traveling nut with the cap, and the opening of the valve is checked by the contact of the traveling nut with the plug, it is obvious that a very slight movement, ordinarily but a quarter-turn, is all that is necessary to effect these operations.

In order to provide for the inevitable wear between the plug and its seat, and to take up such wear, the plug and its nut may be lifted up and the nut turned a sixth of a revolution and reseated in such new position within the angular socket so as to raise the traveling nut with relation to the plug. In assembling the plug, in the first instance, the nut will be screwed down on the stem until its bottom comes into contact with the top of the plug and then the plug will be inserted in open position, so that in the act of closing the valve the nut will ride up the valve-stem against the cap or bottom.

I have found that what is technically known as the "water-hammer" common in high-pressure service may be measurably, if not entirely, obviated by dividing the port in the plug into two or more parts of small diameter, but in the aggregate equal to or about equal to the port in the barrel or casing. This form of invention is illustrated in Fig. 4. The theory of the operation is that the cut-off in closing will be more gradual than if a single opening were made.

In Fig. 5 the rotary hollow plug, the traveling nut, the socket, the stem, the cap or bonnet, and the ports may be as in the bibcock, and are therein correspondingly lettered. The shell or casing $o$ is externally of the ordinary globe-valve pattern, but the bridge or seat is made as a tapering socket $o'$, within which the plug is fitted, and the passage-way through this bridge is lateral at the inlet $o^2$ and vertical at the outlet $o^3$. The cap is shown as provided with a gland $p$ of ordinary construction.

In the gage-cock, Fig. 6, the body $q$ of the cock may be of any approved construction, provided with a tapering valve-seat $r$, within which is a tapering plug $s$ of essentially the construction described with relation to the bib-cock and globe-valve, and differing from it in that the screw-thread $s'$ for the traveling nut is made on the upper end of the plug itself, and the traveling nut $t$ is inserted in the body through a lateral opening $t'$ before the plug is inserted and abuts against the overhanging portion $t^2$ of the outer end of the body. I prefer, also, to arrange the lower end of the plug within an annular recess $u$ within the body $q$, so as to provide against accumulation of grit, rust, &c., about the valve-seat.

$v$ is the discharge-opening.

As already stated, the invention is applicable to all those valvular devices wherein the valve proper is opened and closed by a reciprocating or rotary reciprocating motion.

The invention is useful in valves employed in distributing water, gas, steam, ammonia, volatile and highly-expansible fluids generally, and whether at high pressure or low pressure.

By making the plug hollow and providing for the exit of the fluid through the lateral port in the plug into its interior and thence discharging it from the plug itself rather than through the seat the wear upon the seat by attrition of fluids common to the old construction is avoided.

What I claim is—

1. A valve provided with a tapering seat having a lateral port, a hollow plug adapted to said seat and also having a lateral port to correspond to the port of the valve seat, and a longitudinal exit, a valve stem fast to or made with the said plug and provided with a screwthread, an angularly socketed head on the valve shell or casing and a complemental nut arranged within said socket and traveling longitudinally upon the threaded stem as said stem is rotated to open and close the valve, and a cap or bonnet for covering the said nut within the socket, substantially as described.

2. A valve provided with a rotary or rotary reciprocating plug having a screwthreaded portion fast to or made with the said plug, a traveling nut applied to said screwthread and movable longitudinally thereon by turning said plug, and a chamber within the valve casing within which said traveling nut is confined against rotation while having perfect freedom of motion longitudinally of the screwthreaded portion, the said traveling nut being carried positively by the screwthreaded portion of the plug into contact with a fixed portion of the casing to restrain the further movement of the plug in closing the valve, thereby insuring the seating of the plug, and also by said screwthreaded portion being moved away from said fixed portion in the act of opening the valve, to ease the said plug from its seat, the said nut thereafter coming into contact with the top of the plug to restrain its undue opening movement, substantially as described.

3. A valve comprising a valve casing having a valve seat, and a bonnet, cap or cover, a rotary or rotary reciprocating plug arranged in said seat and provided with a screwthreaded portion fast to or made with it, and a traveling nut applied to said screwthreaded portion between the plug and the cap or other fixed portion of the casing, and restrained from rotary motion, and movable by rotation of the plug in the direction of the length of the plug and toward and from it, substantially as and for the purpose described.

4. A valve comprising a shell or casing, a seat therein, and a nut-receiving cavity, a rotary or rotary reciprocating plug arranged within the valve seat and having a screw threaded portion fast to or made with it, and projecting beyond the shell or casing through said cavity, and a nut applied to such screwthreaded portion and movable lengthwise of the plug by the rotation of the plug while restrained against rotation within its cavity, substantially as and for the purpose described.

5. A valve comprising a shell or casing, a seat therein, and a nut-receiving cavity, a rotary or rotary reciprocating plug arranged within the valve seat and having a screwthreaded portion made fast to or with the said plug and projecting beyond the shell or casing through said cavity, and a nut applied to such screwthreaded portion and movable lengthwise of the plug and by its rotation while restrained against rotation within its cavity, the said nut being adjustable within its said cavity in order to insure accuracy of fit between the plug and its seat, substantially as and for the purpose described.

6. A valve comprising a valve shell, a seat therein, and a nut-receiving cavity made as a polygonal socket, and provided with a cap, cover or bonnet, a rotary or rotary reciprocating plug arranged in the valve seat and provided with a screwthreaded portion made fast to or integral with it and projecting through said cavity and the bonnet, cap or cover, and a traveling nut of the same shape as the polygonal socket and loosely fitted therein against rotation and applied to the screwthreaded portion of the plug so as to travel upon such screwthreaded portion in the direction of its length as said plug is turned to open and close the valve, substantially as and for the purpose described.

In testimony whereof I have hereunto set my hand this 27th day of September, A. D. 1894.

HARRY E. KEYES.

Witnesses:
HENRY MONATH, Jr.,
WM. TUNSTALL.